(12) United States Patent
Wang

(10) Patent No.: US 9,984,839 B2
(45) Date of Patent: May 29, 2018

(54) ILLUMINATED KEYBOARD

(71) Applicant: PRIMAX ELECTRONICS LTD., Taipei (TW)

(72) Inventor: Yi-Chen Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 19 days.

(21) Appl. No.: 15/227,776

(22) Filed: Aug. 3, 2016

(65) Prior Publication Data
US 2017/0338065 A1 Nov. 23, 2017

(30) Foreign Application Priority Data

May 20, 2016 (TW) .............................. 105115790 A

(51) Int. Cl.
*H01H 13/83* (2006.01)
*H01H 13/7065* (2006.01)
*H01H 13/702* (2006.01)
*G06F 3/02* (2006.01)
*F21V 8/00* (2006.01)

(52) U.S. Cl.
CPC ............ *H01H 13/83* (2013.01); *G02B 6/0055* (2013.01); *G06F 3/0202* (2013.01); *H01H 13/702* (2013.01); *H01H 13/7065* (2013.01)

(58) Field of Classification Search
CPC ........... H01H 2219/036; H01H 13/023; H01H 13/14; H01H 13/83; H01H 13/702; H01H 2221/07; H01H 2219/014; H01H 2013/026; H01H 2219/06

USPC .............. 200/5 A, 344, 310–314; 362/23.03, 362/23.05, 84, 23.16, 612, 600, 611, 362/23.01, 615, 623
See application file for complete search history.

(56) References Cited

U.S. PATENT DOCUMENTS

| | | | |
|---|---|---|---|
| 6,171,163 B1* | 1/2001 | Seko | H01J 9/025 428/200 |
| 2011/0253520 A1* | 10/2011 | Lim | H01H 13/83 200/5 A |
| 2012/0097511 A1* | 4/2012 | Liu | H01H 3/125 200/5 A |
| 2014/0138226 A1* | 5/2014 | Chen | H01H 13/704 200/5 A |

(Continued)

*Primary Examiner* — Ahmed Saeed
(74) *Attorney, Agent, or Firm* — Kirton McConkie; Evan R. Witt

(57) ABSTRACT

The present invention provides an illuminated keyboard, including a light guide backplate and a plurality of keys connected to the light guide backplate. The light guide backplate of the present application is made of a light guide material and configured to transmit and project light rays to the keys. A printed circuit layer is formed on the light guide backplate and includes a plurality of conductive switch contacts. Each key includes a key cap, a connection member, and a support member, and the support member has a conductive contact. When the key cap is pressed, the conductive contact of the support member moves downward to trigger a conductive switch contact of the printed circuit layer to generate a switch signal. In the present application, a light guide backplate provides functions, such as guiding light, a function of printed circuit layer, and connecting a key, so as to reduce thickness of the illuminated keyboard.

10 Claims, 4 Drawing Sheets

(56) References Cited

U.S. PATENT DOCUMENTS

2014/0166458 A1\* 6/2014 Chen ................ H03K 17/9622
  200/5 A

\* cited by examiner

ILLUMINATED KEYBOARD

FIELD OF THE INVENTION

The present invention relates to an illuminated keyboard, and particularly to a slim illuminated keyboard.

BACKGROUND OF THE INVENTION

An illuminated keyboard refers to a keyboard in which an illumination component and a backlight module are disposed. The backlight module is configured to transmit light of the illumination component to a key to illuminate the keyboard.

Please refer to FIG. 1. FIG. 1 shows a known illuminated keyboard. The keyboard of FIG. 1 includes a plurality of keys, a switch circuit board D, a light guide plate E, a light source F, a backplate G and a support plate H. Each key includes a key cap A, a key connection member B, and a support member C. The switch circuit board D includes an upper switch circuit board D1, a lower switch circuit board D3, and a separation plate D2 disposed between the switch circuit board D1 and the lower switch circuit board D3. In addition, the upper switch circuit board D1 includes a plurality of upper switch contacts D11, and the lower switch circuit board D3 includes a plurality of lower switch contacts D31.

In the keyboard of FIG. 1, the light guide plate E, the support plate H, the switch circuit board D, the key connection member B, the support member C, and the key cap A are arranged in sequence on the backplate G from the bottom to the top. The support plate H is connected to the key connection member B to provide a function of supporting a key. The light guide plate E receives light rays emitted from the light source F and transmits the light rays upward to the key cap A. When the key cap A is pressed down, the switch circuit board D is triggered by the support member C to generate a switch signal.

It could be known from the foregoing description that the illuminated keyboard of FIG. 1 includes the backplate G, the light guide plate E, the support plate H, and the switch circuit board D that are separate. When the separate plates are stacked together, relatively great thickness is formed, which is disadvantageous to thinning of an illuminated keyboard.

SUMMARY OF THE INVENTION

A main objective of the present invention is to provide a slim illuminated keyboard.

In a preferred embodiment of the present invention, an illuminated keyboard is provided and includes a light guide backplate, a plurality of keys, and a plurality of illumination components. The light guide backplate is made of a light guide material and includes a plurality of limiting structures formed on an upper surface of the light guide backplate and a printed circuit layer formed on the upper surface of the light guide backplate, where the printed circuit layer includes a plurality of conductive switch contacts. The plurality of keys is connected to the upper surface of the light guide backplate, and each of the keys includes a key cap; a connection member, including an upper connection portion and a lower connection portion, where the upper connection portion is connected to the key cap, and the lower connection portion extends into one of the limiting structures, so as to connect the connection member to the light guide backplate; and a support member, disposed below the key cap and having a conductive contact, where when the key cap is pressed, the conductive contact of the support member moves downward to get in contact with one of the conductive switch contacts of the printed circuit layer to generate a switch signal. The plurality of illumination components is disposed on one side of the light guide backplate and configured to emit light rays to the light guide backplate, such that the light guide backplate transmits the light rays upward to the key cap.

In another preferred embodiment of the present invention, an illuminated keyboard is provided and includes a light guide backplate, a protective layer, an insulation layer, a plurality of keys, and a plurality of illumination components. The light guide backplate is made of a light guide material and includes a plurality of limiting structures formed on an upper surface of the light guide backplate and a lower switch circuit layer formed on the upper surface of the light guide backplate, where the lower switch circuit layer includes a plurality of lower conductive switch contacts. The protective layer is disposed above the upper surface of the light guide backplate, where a lower surface of the protective layer forms an upper switch circuit layer, and the upper switch circuit layer includes a plurality of upper conductive switch contacts. The insulation layer is formed between the lower switch circuit layer and the upper switch circuit layer. The plurality of keys is connected to the upper surface of the light guide backplate, and each of the keys includes a key cap; a connection member, including an upper connection portion and a lower connection portion, where the upper connection portion is connected to the key cap, and the lower connection portion extends into one of the limiting structures, so as to connect the connection member to the light guide backplate; and a support member, disposed below the key cap, where when the key cap is pressed, the support member moves downward to press one of the upper conductive switch contacts and one of the lower conductive switch contacts, such that the upper conductive switch contact is connected to the lower conductive switch contact to generate a switch signal. The plurality of illumination components is disposed on one side of the light guide backplate and configured to emit light rays to the light guide backplate, such that the light guide backplate transmits the light rays upward to the key cap.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
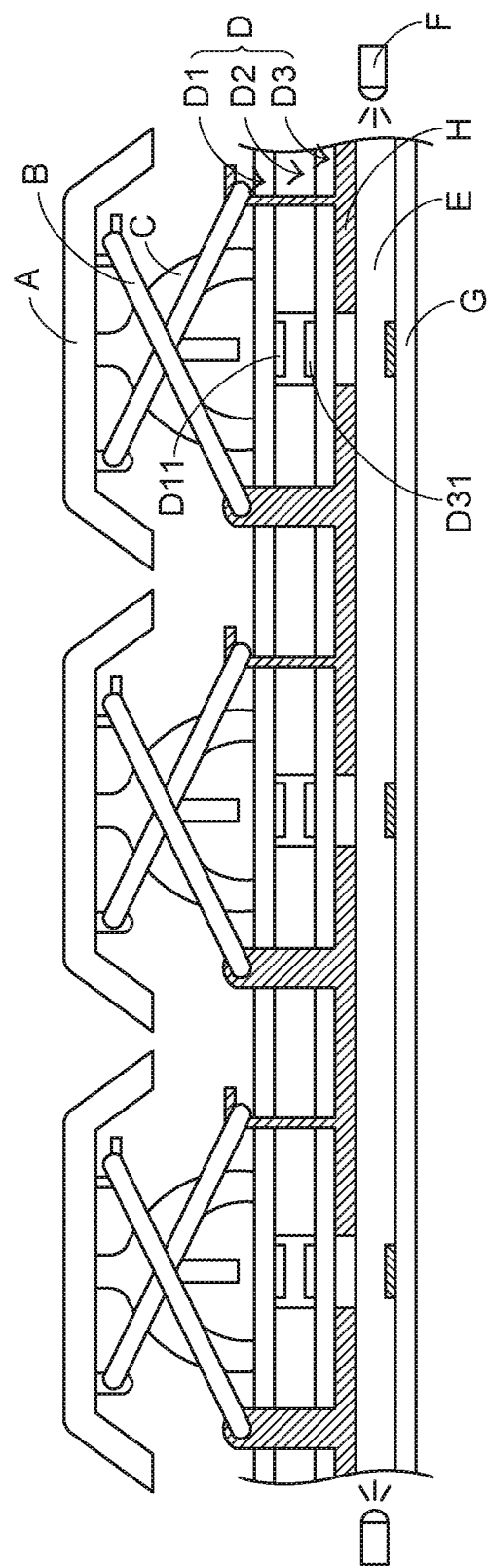
FIG. 1 is a schematic diagram of a known illuminated keyboard.
Figure 2:
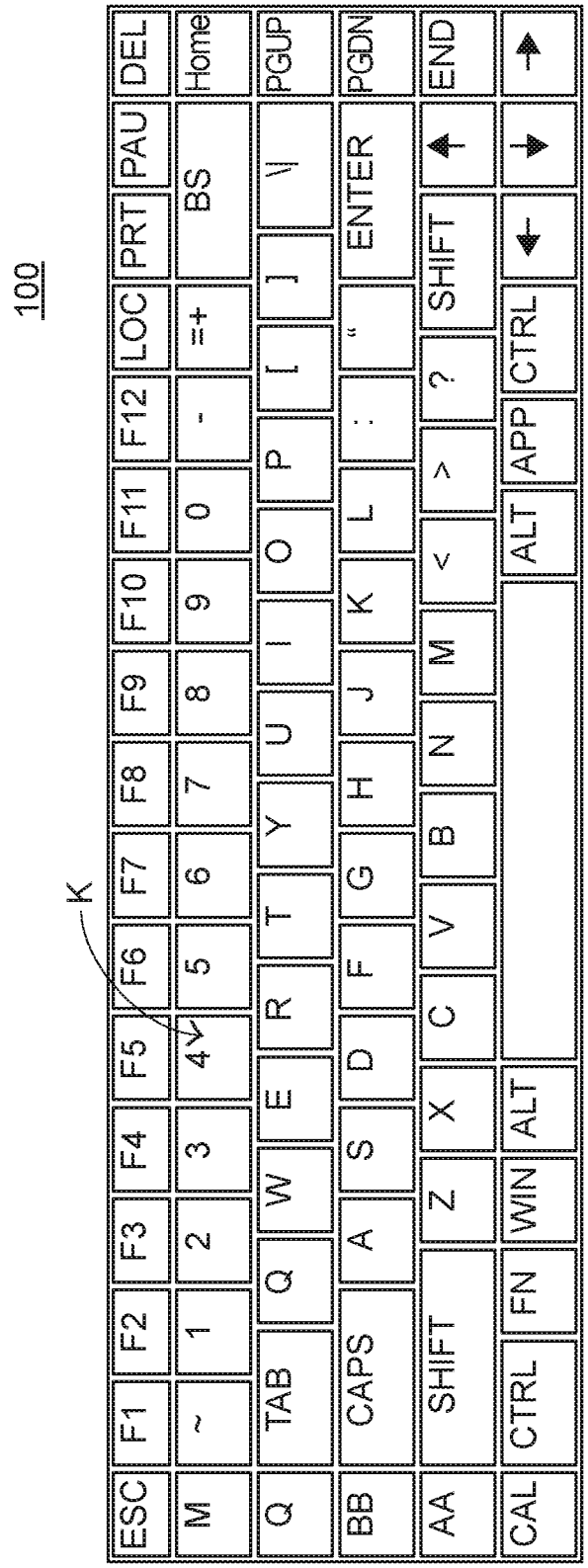
FIG. 2 is a schematic appearance diagram of a preferred embodiment of an illuminated keyboard of the present invention.
Figure 3:
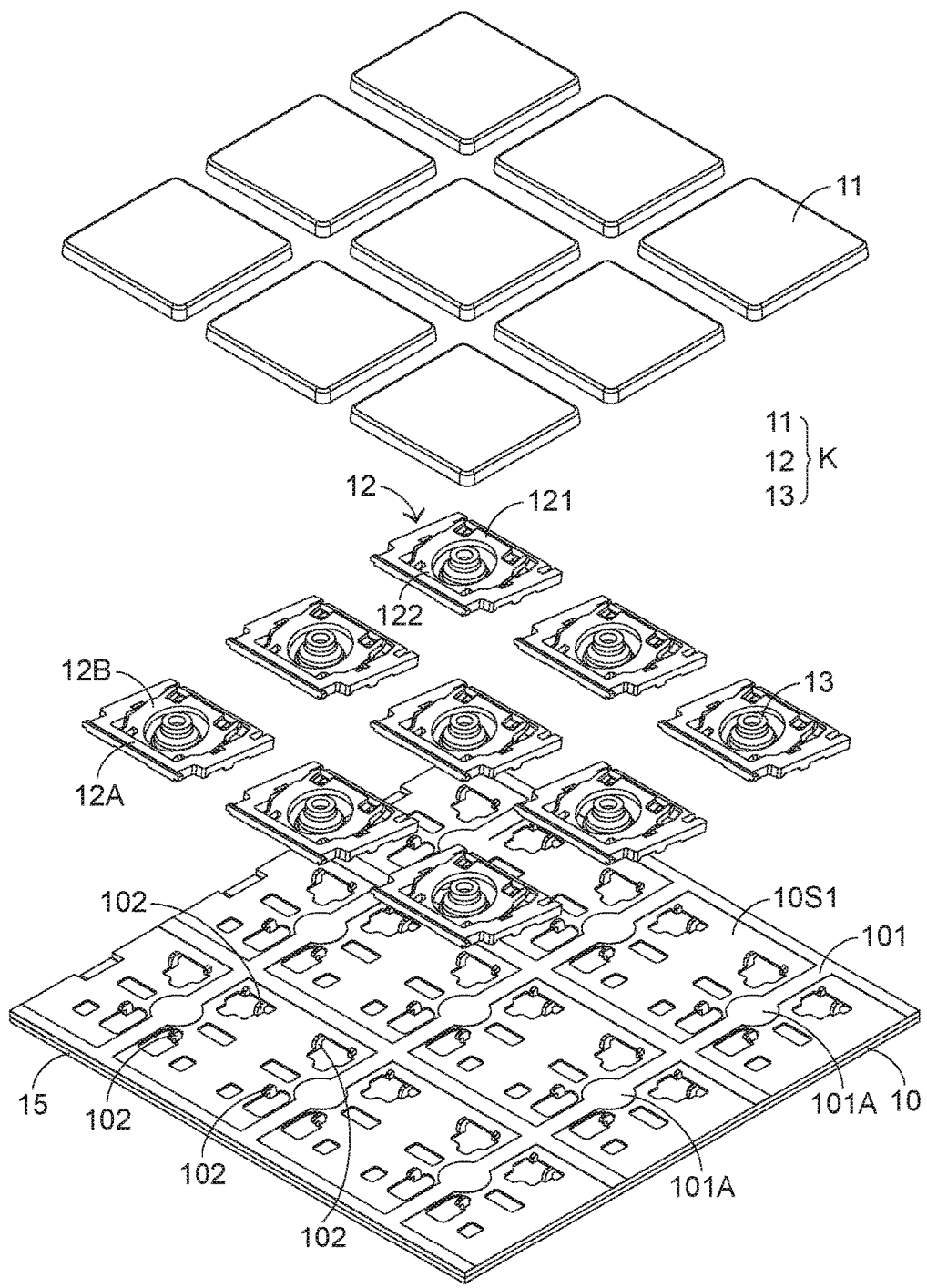
FIG. 3 is an exploded view of a preferred embodiment of an illuminated keyboard of the present invention.

Please refer to FIG. 2 and FIG. 3. FIG. 2 is a schematic appearance diagram of a preferred embodiment of an illuminated keyboard of the present invention, and FIG. 3 is an exploded view of a preferred embodiment of an illuminated keyboard of the present invention. FIG. 2 and FIG. 3 show that an illuminated keyboard 100 of the present invention includes a light guide backplate 10, a plurality of keys K, and a plurality of illumination components 14 (shown in FIG. 4). In order to simplify the drawing, FIG. 3 only shows nine keys. In a preferred embodiment, the illuminated keyboard of the present application further includes a reflective sheet 15 attached to a lower surface 10S2 of the light guide backplate 10.

The light guide backplate 10 is made of a light guide material. A printed circuit layer 101 is formed on the upper surface 10S1 of the light guide backplate 10. The printed circuit layer 101 includes a plurality of conductive switch contacts 101A. In addition, a plurality of limiting structures 102 is further formed on the upper surface 10S1 of the light guide backplate 10. In this embodiment, each limiting structure 102 includes four hook portions, which are integrally formed on the upper surface 10S1 of the light guide backplate 10. Each key K includes a key cap 11, a connection member 12, and a support member 13.

Figure 4:
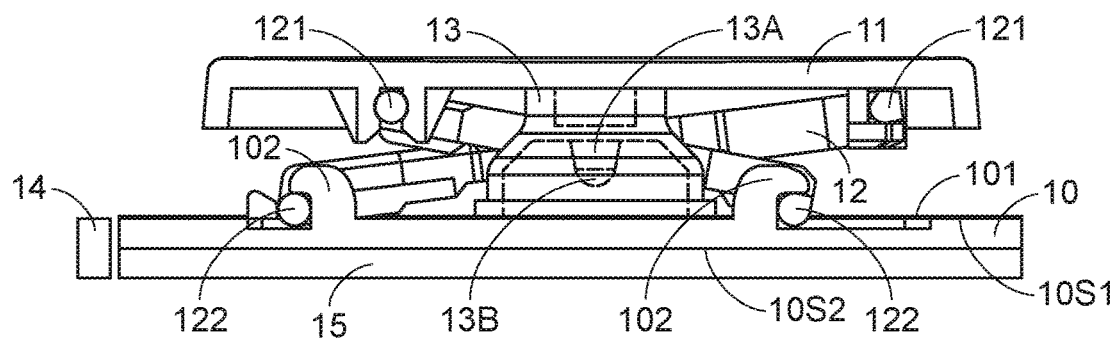
FIG. 4 is a sectional view of a key of the keyboard of FIG. 3.

In the embodiment of FIG. 3, the connection member 12 is a scissors foot component including an outer frame 12A and an inner frame 12B. The support member 13 is an elastic member. Please refer to FIG. 4, which is a sectional view of a single key of the illuminated keyboard of FIG. 3. It could be known from FIG. 4 that an upper connection portion 121 of the connection member 12 is connected to the key cap 11, and a lower connection portion 122 of the connection member 12 is connected to a limiting structure 102 of the light guide backplate 10. The support member 13 is located on the upper surface 10S1 of the light guide backplate 10 and passes through the inner frame 12B of the connection member 12 to get in contact with the key cap 11. Each support member 13 further includes an acting post 13A. In the embodiment of FIG. 4, an end of the acting post 13A has a conductive contact 13B, for example, a carbon contact. Each support member 13 corresponds to a conductive switch contact 101A of the printed circuit layer 101.

When the key cap 11 is pressed, the support member 13 is pressed down by the key cap 11 and generates deformation, so as to enable the acting post 13A to move downward and get in contact with a conductive switch contact 101A of the printed circuit layer 101. The carbon contact 13B located at the end of the acting post 13A gets in contact with the conductive switch contact 101A to generate a switch signal. FIG. 4 further indicates that an illumination component 14 is disposed on one side of the light guide backplate 10. Light rays emitted from the illumination component 14 are projected into the light guide backplate 10. A light guide structure is disposed at a position, corresponding to the key cap 11, of the light guide backplate 10 (not shown in the drawing). When the light rays travel inside the light guide backplate 10 to the position provided with the light guide structure, the light guide structure refracts the light rays upward to illuminate the key cap 11.

Figure 5:
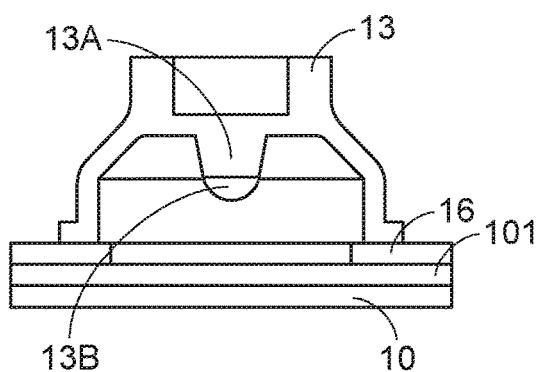
FIG. 5 is a local sectional view of a key of a second preferred embodiment of an illuminated keyboard of the present invention.

Please refer to FIG. 5, which is a local sectional view of a key of a second preferred embodiment of an illuminated keyboard of the present invention. In order to simplify the drawing, FIG. 5 merely shows a component configured to describe a difference from the embodiment of FIG. 4. In the embodiment of FIG. 5, a light guide backplate 10, a printed circuit layer 101 formed on am upper surface of the light guide backplate 10, and a support member 13 having an acting post 13A and a conductive contact 13B are also included. The embodiment of FIG. 5 differs from the embodiment of FIG. 4 in that the embodiment of FIG. 4 further includes a protective layer 16 formed on the printed circuit layer 101, so as to protect a silver line that forms the printed circuit layer 101. The protective layer 16 may be implemented by using, for example, a UV adhesive coating or a Mylar film.

Figure 6:
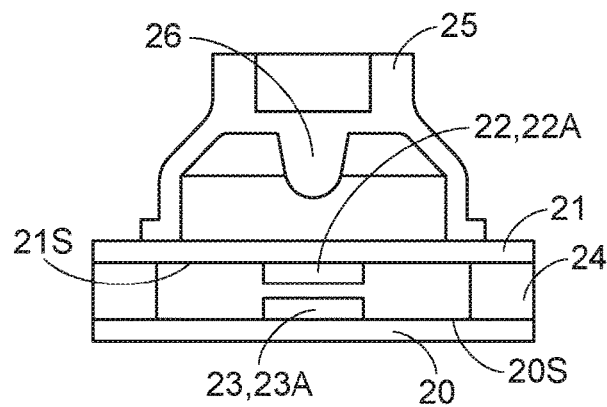
FIG. 6 is a local sectional view of a key of a third preferred embodiment of an illuminated keyboard of the present invention.

Please refer to FIG. 6, which is a local sectional view of a key of a third preferred embodiment of an illuminated keyboard of the present invention. In order to simplify the drawing, FIG. 6 merely shows a component configured to describe a difference from the embodiment of FIG. 4. FIG. 6 shows a light guide backplate 20, a protective layer 21, and a connection member 25 having an acting post 26. The protective layer 21 in this embodiment may be implemented by using, for example, a Mylar film. The embodiment of FIG. 6 differs from the embodiment of FIG. 4 in that switch circuit structures of the two embodiments are different and the acting post 26 of the connection member 25 of FIG. 6 does not have a conductive contact. In the embodiment of FIG. 6, a switch circuit includes an upper switch circuit layer 22 and a lower switch circuit layer. The upper switch circuit layer 22 includes a plurality of upper conductive switch contacts 22A, but FIG. 6 merely shows one upper conductive switch contact 22A. The lower switch circuit layer 23 includes a plurality of lower conductive switch contacts 23A, but FIG. 6 merely shows one lower conductive switch contact 23A. Each connection member 25 corresponds to an upper conductive switch contact 22A and a lower conductive switch contact 23A. The upper switch circuit layer 22 is formed on a lower surface 21S of a Mylar film 21, and the lower switch circuit layer 23 is formed on an upper surface 20S of the light guide backplate 20. There is a circuit insulation layer 24 between the upper switch circuit layer 22 and the lower switch circuit layer 23. The circuit insulation layer 24 may be implemented by using, for example, a UV adhesive. When the connection member 25 deforms because of press of a finger, the acting post 26 moves downward to press the Mylar film 21 to enable the upper conductive switch contact 22A of the Mylar film 21 to move downward and get in contact with the lower conductive switch contact 23A formed on the light guide backplate 20, so as to generate a switch signal.

It could be known from the foregoing description that the light guide backplate of the illuminated keyboard of the present application is made of a light guide material, such that the light guide backplate may be configured to transmit light rays upward to a key. In addition, the illuminated keyboard of the present application does not have a board for disposing a switch circuit, and instead, a printed circuit layer is disposed on a light guide backplate, and a conductive contact is disposed on an acting post of support member, so as to form a switch signal by using a conductive contact between the printed circuit layer and the support member. Further, in the illuminated keyboard of the present application, a limiting structure used by the connection member is directly formed on the light guide backplate. Therefore, the connection member is directly connected to the light guide backplate, and it is unnecessary to additionally provide a support plate used by the connection member. Therefore, the illuminated keyboard of the present application can effectively reduce thickness of the keyboard.

What is described in the foregoing is only an exemplary embodiment of the present invention, and is not intended to limit the scope of the claims of the present invention, that is, all equivalent changes or modifications made without departing from the spirit disclosed by the present invention fall within the scope of the claims of the present application.

What is claimed is:

1. An illuminated keyboard, comprising:
   a light guide backplate, made of a light guide material and comprising a plurality of light guide limiting structures directly formed on an upper surface of the light guide backplate and a printed circuit layer formed on the upper surface of the light guide backplate, the printed circuit layer comprising a plurality of conductive switch contacts;
   a plurality of keys, connected to the upper surface of the light guide backplate, each of the keys comprising:
   a key cap;
   a connection member, comprising an upper connection portion and a lower connection portion, wherein the upper connection portion is connected to the key cap, and the lower connection portion extends into one of the light guide limiting structures, so as to connect the connection member to the light guide backplate; and
   a support member, disposed below the key cap and having a conductive contact, wherein when the key cap is pressed, the conductive contact of the support member moves downward to get in contact with one of the conductive switch contacts of the printed circuit layer to generate a switch signal; and
   a plurality of illumination components, disposed on one side of the light guide backplate and configured to emit light rays to the light guide backplate, such that the light guide backplate including the light guide limiting structures transmits the light rays upward to the key cap.

2. The illuminated keyboard according to claim 1, further comprising a reflective sheet attached to a lower surface of the light guide backplate.

3. The illuminated keyboard according to claim 1, wherein the support member is an elastic member, the elastic member comprises an acting post, and the conductive contact is a carbon contact formed on an end of the acting post.

4. The illuminated keyboard according to claim 1, further comprising a protective sheet attached to a lower surface of the light guide backplate.

5. The illuminated keyboard according to claim 4, wherein the protective sheet is a UV adhesive coating.

6. The illuminated keyboard according to claim 4, wherein the protective sheet is a Mylar film.

7. The illuminated keyboard according to claim 1, wherein the connection member is a scissors foot component, and each of the light guide limiting structures comprises four hook portions integrally formed on the upper surface of the light guide backplate.

8. An illuminated keyboard, comprising:
   a light guide backplate, made of a light guide material and comprising a plurality of light guide limiting structures directly formed on an upper surface of the light guide backplate and a lower switch circuit layer formed on the upper surface of the light guide backplate, the lower switch circuit layer comprising a plurality of lower conductive switch contacts;
   a protective layer, disposed above the upper surface of the light guide backplate, wherein a lower surface of the protective layer forms an upper switch circuit layer, and the upper switch circuit layer comprises a plurality of upper conductive switch contacts;
   an insulation layer, formed between the lower switch circuit layer and the upper switch circuit layer;
   a plurality of keys, connected to the upper surface of the light guide backplate, each of the keys comprising:
   a key cap;
   a connection member, comprising an upper connection portion and a lower connection portion, wherein the upper connection portion is connected to the key cap, and the lower connection portion extends into one of the light guide limiting structures, so as to connect the connection member to the light guide backplate; and
   a support member, disposed below the key cap, wherein when the key cap is pressed, the support member moves downward to press one of the upper conductive switch contacts and one of the lower conductive switch contacts, such that the upper conductive switch contact is connected to the lower conductive switch contact to generate a switch signal; and
   a plurality of illumination components, disposed on one side of the light guide backplate and configured to emit light rays to the light guide backplate, such that the light guide backplate including the light guide limiting structures transmits the light rays upward to the key cap.

9. The illuminated keyboard according to claim 8, wherein the protective layer is a Mylar film, and the insulation layer is a UV adhesive coating.

10. The illuminated keyboard according to claim 1, wherein the connection member is a scissors foot component, and each of the light guide limiting structures comprises four hook portions integrally formed on the upper surface of the light guide backplate.

* * * * *